United States Patent
Yang

(10) Patent No.: US 10,002,054 B2
(45) Date of Patent: Jun. 19, 2018

(54) METHOD AND SYSTEM FOR PERFORMING AUTOMATIC SYSTEM RECOVERY

(71) Applicant: MITAC COMPUTING TECHNOLOGY CORPORATION, Taoyuan (TW)

(72) Inventor: Shun-Chieh Yang, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 197 days.

(21) Appl. No.: 15/238,344

(22) Filed: Aug. 16, 2016

(65) Prior Publication Data

US 2017/0052854 A1 Feb. 23, 2017

(30) Foreign Application Priority Data

Aug. 18, 2015 (TW) .............................. 104126826 A

(51) Int. Cl.
*G06F 11/00* (2006.01)
*G06F 11/14* (2006.01)
*G06F 9/44* (2018.01)

(52) U.S. Cl.
CPC ........ *G06F 11/1469* (2013.01); *G06F 9/4401* (2013.01); *G06F 11/1417* (2013.01); *G06F 2201/805* (2013.01); *G06F 2201/815* (2013.01); *G06F 2201/82* (2013.01)

(58) Field of Classification Search
CPC . G06F 11/1469; G06F 11/1417; G06F 9/4401
See application file for complete search history.

(56) References Cited

U.S. PATENT DOCUMENTS

| 7,484,084 | B1* | 1/2009 | Ranaweera | G06F 8/656 713/1 |
| 8,386,842 | B2* | 2/2013 | Lin | G06F 11/1417 714/2 |
| 8,954,805 | B2* | 2/2015 | Liu | G06F 8/654 714/36 |
| 2005/0229173 | A1* | 10/2005 | Mihm | G06F 8/65 717/171 |

(Continued)

FOREIGN PATENT DOCUMENTS

TW 201243722 A1 11/2012

OTHER PUBLICATIONS

Taiwan Search Report for Application No. 104126826, dated Sep. 19, 2016.

*Primary Examiner* — Marc Duncan
(74) *Attorney, Agent, or Firm* — Michael Best & Friedrich LLP

(57) ABSTRACT

A method for performing automatic system recovery is implemented by a server including a control chipset and a baseboard management controller (BMC). In the method, when a current image file is corrupted, a recovery engine generates an indicator of a version of the current image file and transmits the indicator to the BMC. The BMC then transmits a request for a backup image file to an external electronic device. After the BMC receives file link information of a disk image file from the electronic device, the BMC accesses the electronic device to download the disk image file, and mounts the disk image file as a virtual disk on the BMC. Afterward, the recovery engine replaces the current image file with the disk image file from the virtual disk.

16 Claims, 2 Drawing Sheets

(56) References Cited

U.S. PATENT DOCUMENTS

| | | | |
|---|---|---|---|
| 2007/0002730 A1* | 1/2007 | Lu | G06F 11/0793 370/216 |
| 2008/0077711 A1* | 3/2008 | Cepulis | G06F 9/4406 709/250 |
| 2010/0228960 A1* | 9/2010 | Huang | G06F 8/65 713/100 |
| 2012/0023320 A1* | 1/2012 | Chen | G06F 11/0793 713/2 |
| 2015/0149815 A1* | 5/2015 | Maity | G06F 11/1435 714/5.11 |
| 2015/0331694 A1* | 11/2015 | Balakrishnan | G06F 3/06 713/2 |
| 2017/0024303 A1* | 1/2017 | Christopher | G06F 11/366 |

* cited by examiner

METHOD AND SYSTEM FOR PERFORMING AUTOMATIC SYSTEM RECOVERY

CROSS-REFERENCE TO RELATED APPLICATION

This application claims priority of Taiwanese Patent Application No. 104126826, filed on Aug. 18, 2015.

FIELD

The disclosure relates to a method and a system for performing automatic system recovery.

BACKGROUND

In a server, such as a computer server, a booting process is executed byabasic input/output system (BIOS) that utilizes an existing image file containing information used for the boot process. When the existing image file becomes corrupted, the BIOS may not be able to properly execute the boot process.

Conventionally, the existing image file can be fixed by a process named "system recovery", which may be executed in a number of ways. For example, a user may connect a storage device (e.g., a compact disk (CD), a flash drive, etc.) that contains a backup image file (that is not corrupted) to the server, and the BIOS is configured to access the storage device via a southbridge of the server, and to retrieve the backup image file in order to replace the existing image file. In another way, the user may operate a web user interface (UI) to enable a baseboard management controller (BMC) to load the backup image file from a remote computer, and to allow the BIOS to retrieve the backup image file from the BMC.

It is noted that, in executing the system recovery, the user needs to identify a version of the existing image file to ensure that the loaded backup image file is of a version that conforms with that of the existing image file.

SUMMARY

An object of the disclosure is to provide a method for performing an automatic system recovery.

According to one aspect of the disclosure, the method is to be implemented by a server. The server includes a control chipset and a baseboard management controller (BMC). The control chipset includes a central processing unit (CPU) for executing a basic input/output system (BIOS). The BIOS has a current image file and a recovery engine therein. The current image file contains data used in a boot process of the server. The method includes the steps of:

when the current image file is corrupted, generating, by the recovery engine executed by the control chipset, an indicator of a version of the current image file and transmitting, via the control chipset, the indicator to the BMC;

in response to receipt of the indicator, transmitting, by the BMC, a request for a backup image file to an electronic device that is external to the server, the request including information about the version of the current image file;

receiving, by the BMC, file link information of a disk image file from the electronic device, the disk image file having a version identical to that of the current image file;

according to the file link information, accessing, by the BMC, the electronic device so as to download the disk image file, and mounting the disk image file as a virtual disk on the BMC; and replacing, by the recovery engine executed by the control chipset, the current image file with the disk image file from the virtual disk.

Another object of the disclosure is to provide a system that is configured to execute the above-mentioned method.

According to one embodiment of the disclosure, a system for performing automatic system recovery, includes:

a server including a control chipset and a baseboard management controller (BMC), the control chipset including a central processing unit (CPU) for executing a basic input/output system (BIOS), the BIOS having a current image file and a recovery engine therein, the current image file containing data used in a boot process of the server;

wherein:

the server is coupled to an electronic device that is external to the server, thethethe electronic device storing a plurality of disk image files therein, each of the disk image files being of a specific version;

when the current image file is corrupted:
the recovery engine executed by the control chipset is configured to generate an indicator of a version of the current image file, and to transmit, via the control chipset, the indicator to the BMC;

in response to the indicator, the BMC is configured to transmit a request for a backup image file to the electronic device, the request including information about the version of the current image file;

in response to receipt of file link information, which contains a link directed to one of the disk image files, from the electronic device, the BMC is configured to access, according to the file link information, the electronic device so as to download the disk image file, and mounting the disk image file as a virtual disk on the BMC; and replacing, by the recovery engine executed by the control chipset, the current image file with the disk image file from the virtual disk.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
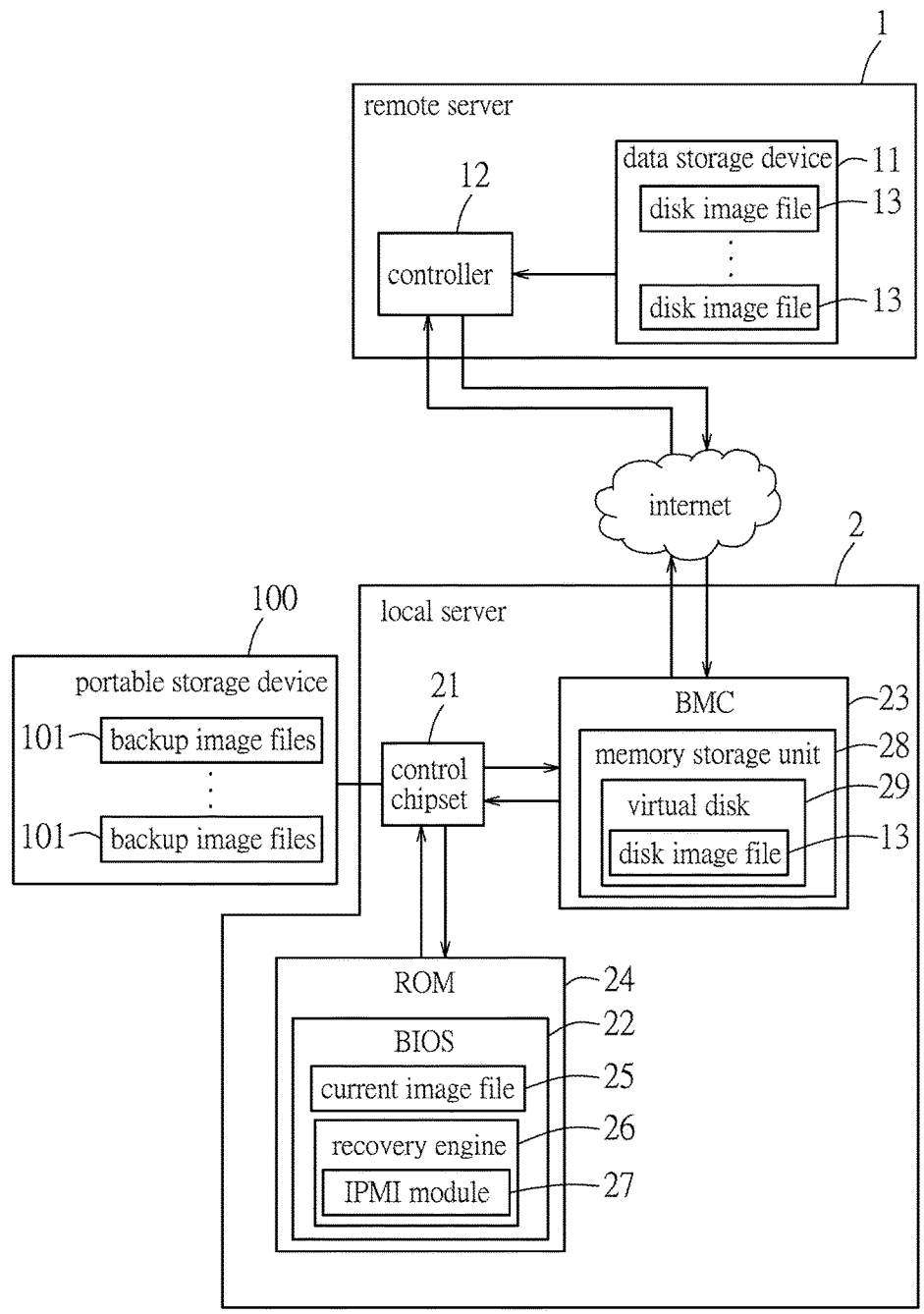
FIG. 1 is a block diagram illustrating a system for performing automatic system recovery, according to one embodiment of the disclosure.

FIG. 1 illustrates a system for performing automatic system recovery, according to one embodiment of the disclosure. The system includes a server, exemplified as a herein but not limited thereto, coupled to an electronic device external to the local server 2. In this embodiment, the electronic device is exemplified as a remote server 1.

The local server 2 includes a control chip set 21 that executes a basic input/output system (BIOS) 22, and a baseboard management controller (BMC) 23.

In this embodiment, the control chipset 21 may include a platform controller hub (PCH) and a central processing unit (CPU).

The BIOS 22 is burned within a read-only memory (ROM) 24, and includes a current image file 25 and a recovery engine 26. The recovery engine 26 may be implemented using an application program, and includes an intelligent platform management interface (IPMI) module 27.

The BMC 23 includes a memory storage unit 28. In this embodiment, the memory storage unit 28 maybe implemented using a dynamic random access memory (DRAM). The memory storage unit 28 provides storage space for the BMC 23 to mount data thereon as a virtual disk 29, which may be accessed by the recovery engine 26 via the control chipset 21. An example of the virtual disk 29 is a virtual flash drive.

The remote server 1 includes a data storage device 11 and a controller 12. The data storage device 11 stores a plurality of disk image files 13 therein, each having of a specific version. The disk image files 13 contain information used for a boot process of the system. The controller 12 is coupled to the data storage device 11, and is capable of communicating with the BMC 23 of the local server 2 via a network (e.g., the Internet, using Transmission Control Protocol (TCP)/Internet Protocol (IP), etc.). In one embodiment, the controller 12 is implemented as an application installed in the remote server 1.

Figure 2:
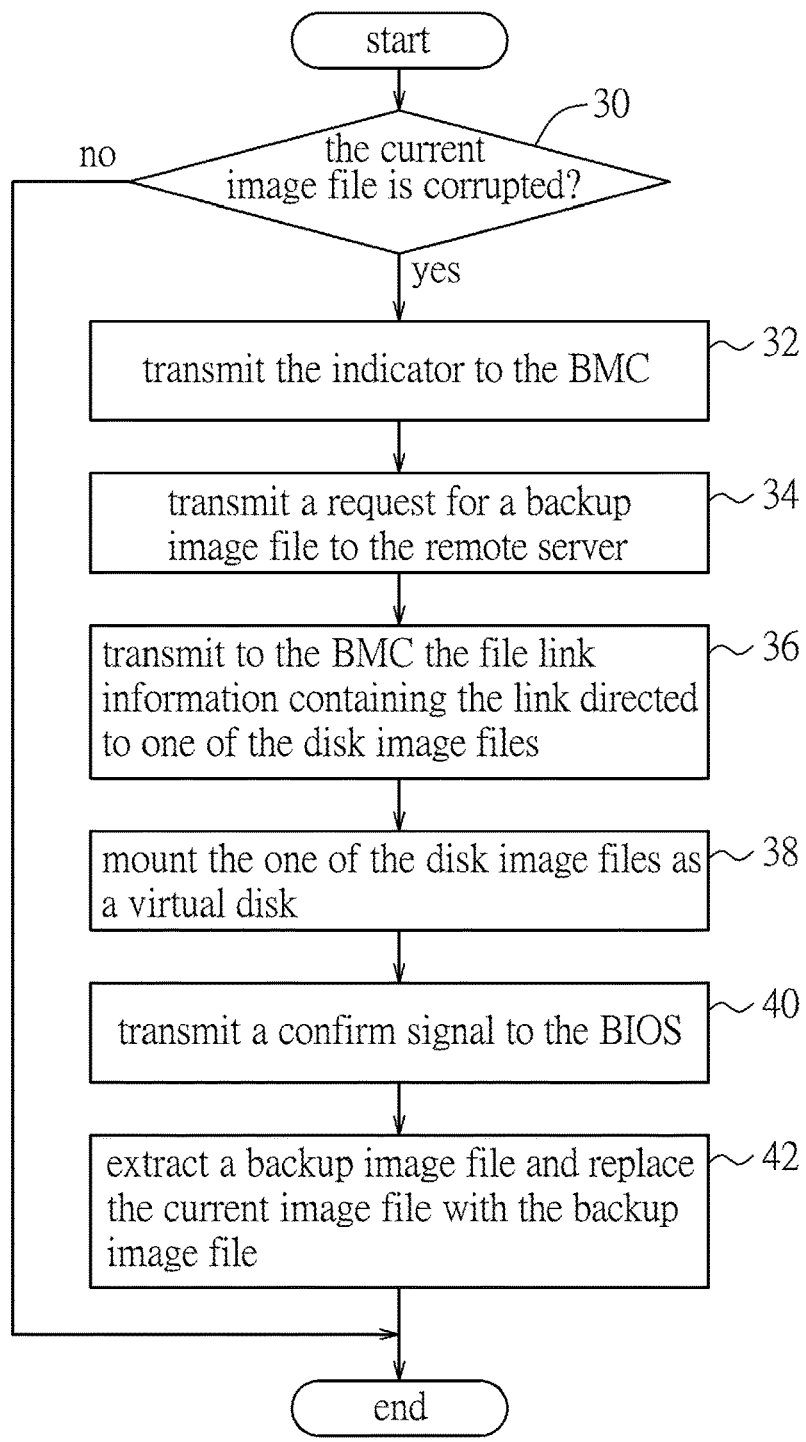
FIG. 2 is a flow chart illustrating steps of a method for performing automatic system recovery, according to one embodiment of the disclosure.

FIG. 2 illustrates steps of a method for performing automatic system recovery to be implemented by the aforesaid system, according to one embodiment of the disclosure. In this embodiment, when the BIOS 22 is executed by the CPU of the control chipset 21, the BIOS 22 causes the CPU to perform various steps of the method.

In step 30, during a boot process of the system, the recovery engine 26, executed by the CPU, determines whether the current image file 25 is corrupted. When it is determined that the current image file 25 is not corrupted, the boot process may be carried out correctly, and the method may be terminated.

On the other hand, when it is determined that the current image file 25 is corrupted, the flow proceeds to step 32.

In step 32, the recovery engine 26 generates an indicator, and transmits the indicator to the BMC 23 via the CPU of the control chipset 21. The indicator includes of a version of the current image file 25.

In step 34, the BMC 23 receives the indicator, and in response, the BMC 23 transmits a request for a backup image file to the remote server 1 via the network. The request includes information about the version of the current image file 25. In this embodiment, the term "backup image file" refers to one of the disk image file 13 that is stored in the data storage device 11 and that is to be used for replacing the current image file 25 that is deemed to be corrupted.

In step 36, in response to the request for the backup image file, the controller 12 of the remote server 1 locates one of the disk image files 13 of the specific version that conforms with the version of the current image file 25 that is to be replaced. Afterward, the controller 12 generates a link directed to the one of the disk image files 13, and transmits file link information containing the link to the BMC 23 via the network. Specifically, the file link information includes information such as the link directed to the disk image file 13, a size of the disk image file 13, and a format of the disk image file 13.

In step 38, the BMC 23 receives the file link information, and mounts the one of the disk image files 13 (which serves as the backup image file) as a virtual disk 29 on the memory storage unit 28, according to the file link information.

Specifically, using the file link information, the BMC 23 is capable of accessing the data storage device 11, and to locate one of the disk image files 13 that has a version identical to that of the current image file. Afterward, the BMC 23 downloads the one of the disk image files 13 and mounts the downloaded disk image files on the memory storage unit 28 as the virtual disk 29.

In step 40, the BMC 23 transmits a confirm signal to the BIOS 22 via the control chipset 21, indicating that the one of the disk image files 13 has been mounted on the memory storage unit 28.

Specifically, in this embodiment, after transmitting the indicator in step 32, the recovery engine 26 further transmits an ask signal periodically to the BMC 23. Accordingly, in step 40, the BMC 23 transmits the confirm signal to the recovery engine 26 in response to receipt of the ask signal after the virtual disk 29 is mounted.

In step 42, the recovery engine 26 accesses the virtual disk 29 via the control chipset 21, in order to obtain the one of the disk image files 13 stored therein. Afterward, the recovery engine 26 executed by the control chipset 21 replaces the current image file 25 with the one of the disk image files 13 from the virtual disk. As such, the current image file 25 which is corrupted may be automatically replaced by the (functional) disk image files 13, completing the system recovery.

In one embodiment, the automatic system recovery may be performed using the data stored in a portable storage device 100.

Specifically, the portable storage device 100 stores a plurality of disk image files 101 therein. Each of the disk image files 101 corresponds to a specific version.

When the portable storage device 100 is electrically connected to the control chipset 21, the recovery engine 26 is configured to locate, in the portable storage device 100, one of the disk image files 101 that is of the specific version conforming with the version of the current image file 25.

When the one of the disk image files 101 is located and when it is determined that the current image file 25 is corrupted, the recovery engine 26 is configured to retrieve the one of the disk image files 101 stored in the portable storage device 100 via the control chipset 21.

Afterward, the recovery engine 26 is configured to replace the current image file 25 using the one of the disk image files 101.

To sum up, the method and system as described in the disclosure are capable of performing an automatic system recovery, which eliminates the need for a user to identify the version of the current image file 25.

This disclosure is not limited to the disclosed exemplary embodiments but is intended to cover various arrangements included within the spirit and scope of the broadest interpretation so as to encompass all such modifications and equivalent arrangements.

What is claimed is:

1. A method for performing automatic system recovery, the method to be implemented by a server that includes a control chipset and a baseboard management controller (BMC), the control chipset including a central processing unit (CPU) for executing a basic input/output system (BIOS), the BIOS having a current image file and a recovery engine therein, the current image file containing data used in a boot process of the server, the method comprising the steps of:

when the current image file is corrupted, generating, by the recovery engine executed by the control chipset, an indicator of a version of the current image file and transmitting, via the control chipset, the indicator to the BMC;

in response to receipt of the indicator, transmitting, by the BMC, a request for a backup image file to an electronic device external to the server, the request including information about the version of the current image file;

receiving, by the BMC, file link information of a disk image file from the electronic device, the disk image file having a version identical to that of the current image file;

according to the file link information, accessing, by the BMC, the electronic device so as to download the disk image file, and mounting the disk image file as a virtual disk on the BMC; and replacing, by the recovery engine executed by the control chipset, the current image file with the disk image file from the virtual disk.

2. The method of claim 1, further comprising the step of determining by the recovery engine whether the current image file is corrupted.

3. The method of claim 1, further comprising, before the step of replacing the current image file with the disk image file from the virtual disk, the step of transmitting, by the BMC, a confirm signal to the BIOS after the disk image file is mounted so as to notify the BIOS that the disk image file is mounted.

4. The method of claim 3, further comprising, after the step of transmitting an indicator to the BMC, the step of transmitting by the recovery engine an ask signal periodically to the BMC for asking the disk image file;

wherein, in the step of transmitting a confirm signal to the BIOS, after the disk image file is mounted, the BMC transmits the confirm signal to the recovery engine in response to receipt of the ask signal.

5. The method of claim 1, wherein the electronic device is a remote server communicating with the server via a network.

6. The method of claim 1, wherein the electronic device is a portable storage device electrically connected to the control chipset.

7. The method of claim 1, wherein the file link information includes a link to the disk image file, a size of the disk image file, and a format of the disk image file.

8. The method of claim 1, wherein:
the step of mounting the disk image file as a virtual disk on the BMC includes mounting data on storage space of a memory storage unit included in the BMC as the virtual disk; and
the virtual disk is capable of being accessed by the recovery engine via the control chipset.

9. A system for performing automatic system recovery, comprising:
a server including a control chipset and a baseboard management controller (BMC), the control chipset including a central processing unit (CPU) for executing a basic input/output system (BIOS), the BIOS having a current image file and a recovery engine therein, the current image file containing data used in a boot process of the server;
wherein:
the server is coupled to an electronic device that is external to the server, thethethe electronic device storing a plurality of disk image files therein, each of the disk image files being of a specific version;
when the current image file is corrupted:
the recovery engine executed by the control chipset is configured to generate an indicator of a version of the current image file, and to transmit, via the control chipset, the indicator to the BMC;

in response to the indicator, the BMC is configured to transmit a request for a backup image file to the electronic device, the request including information about the version of the current image file;

in response to receipt of file link information, which contains a link directed to one of the disk image files, from the electronic device, the BMC is configured to access, according to the file link information, the electronic device so as to download the disk image file, and mounting the disk image file as a virtual disk on the BMC; and replacing, by the recovery engine executed by the control chipset, the current image file with the disk image file from the virtual disk.

10. The system of claim 9, wherein the recovery engine is configured to determine whether the current image file is corrupted.

11. The system of claim 9, wherein the BMC is further configured to transmit a confirm signal to the BIOS after the one of the disk image files is mounted, so as to notify the BIOS that the disk image file is mounted.

12. The system of claim 9, wherein:
after transmitting the indicator, the recovery engine of the BIOS is further configured to transmit an ask signal periodically to the BMC;
in transmitting a confirm signal to the BIOS, after the disk image file is mounted, the BMC transmits the confirm signal to the recovery engine in response to receipt of the ask signal.

13. The system of claim 9, wherein:
the electronic device is a portable storage device that stores a plurality of backup image files each corresponding to a specific version is electrically connected to the control chipset, the recovery engine is configured to locate one of the disk image files in the portable storage device of the specific version that is identical to that of the current image file;
when the one of the backup image files is located and, the recovery engine is configured to retrieve the one of the backup image files stored in the portable storage device via the control chipset, and to replace the current image file with the disk image file having specific version conforms with that of the current image file.

14. The system of claim 9, wherein the file link information includes a link to the disk image file, a size of the disk image file, and a format of the disk image file.

15. The system of claim 9, wherein:
the electronic device is a remote server that includes a data storage device that stores the disk image files therein and a controller coupled to the data storage device;
in response to receipt of the request from the BMC of the server, the controller is configured to
locate one of the disk image files of the specific version that conforms with the version of the current image file;
generate a link directed to the one of the disk image files; and
transmit to the BMC the file link information containing the link.

16. The system of claim 9, wherein:
the BMC includes a memory storage unit that provides storage space for the BMC to mount data thereon as the virtual disk; and the virtual disk is capable of being accessed by the recovery engine via the control chipset.

* * * * *